US012605626B2

(12) United States Patent    (10) Patent No.:    US 12,605,626 B2

Morimura    (45) Date of Patent:    Apr. 21, 2026

(54) GAME SYSTEM THAT ALLOWS IMPROVEMENT IN CONVENIENCE OF USER IN SELECTION OF GAME, NON-TRANSITORY STORAGE MEDIUM ENCODED WITH COMPUTER READABLE INFORMATION PROCESSING PROGRAM, AND INFORMATION PROCESSING METHOD

(71) Applicant: Nintendo Co., Ltd., Kyoto (JP)

(72) Inventor: Naoya Morimura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 373 days.

(21) Appl. No.: 18/326,504

(22) Filed: May 31, 2023

(65) Prior Publication Data

US 2024/0181342 A1    Jun. 6, 2024

(30) Foreign Application Priority Data

Dec. 1, 2022    (JP) ................................. 2022-192979

(51) Int. Cl.
| | |
|---|---|
| *A63F 13/00* | (2014.01) |
| *A63F 13/48* | (2014.01) |
| *A63F 13/49* | (2014.01) |
| *A63F 13/533* | (2014.01) |

(52) U.S. Cl.
CPC .............. *A63F 13/49* (2014.09); *A63F 13/48* (2014.09); *A63F 13/533* (2014.09)

(58) Field of Classification Search
None
See application file for complete search history.

(56) References Cited

U.S. PATENT DOCUMENTS

| | | | | |
|---|---|---|---|---|
| 8,434,020 B2 * | 4/2013 | Martyn | ............. | H04M 1/72469 |
| | | | | 715/808 |
| 8,713,476 B2 * | 4/2014 | Martyn | ............. | H04M 1/72436 |
| | | | | 715/811 |
| 9,031,375 B2 * | 5/2015 | Trautman | ............. | G11B 27/105 |
| | | | | 386/285 |
| 10,127,783 B2 * | 11/2018 | Laska | ............. | G08B 13/19652 |

(Continued)

FOREIGN PATENT DOCUMENTS

| | | |
|---|---|---|
| JP | 2012125451 A | 7/2012 |
| JP | 2014121610 A | 7/2014 |

(Continued)

*Primary Examiner* — Paul A D'Agostino

(74) *Attorney, Agent, or Firm* — Scully, Scott, Murphy & Presser, P.C.

(57)    ABSTRACT

A game system includes at least one computer, a first storage configured to store a plurality of game programs, and a second storage configured to store save data of the plurality of game programs and to store a plurality of pieces of save data for at least one game program. The computer causes the second storage to store save data of the game program that is being executed, based on a status of execution of the game program, causes a display to show a list of corresponding information for each piece of save data of the game program for which a plurality of pieces of save data are stored, and selects information corresponding to one piece of save data from the shown list of information corresponding to the save data shown on the display in accordance with an operation input from a user.

22 Claims, 12 Drawing Sheets

(56)  References Cited

U.S. PATENT DOCUMENTS

| | | | |
|---|---|---|---|
| 11,623,146 B2* | 4/2023 | Rispoli | H04N 21/23418 |
| | | | 463/31 |
| 11,792,238 B2* | 10/2023 | Ahn | H04L 65/4025 |
| | | | 370/352 |
| 12,005,354 B2* | 6/2024 | Jarzebinski | A63F 13/355 |
| 12,070,696 B2* | 8/2024 | Thielbar | A63F 13/798 |
| 12,357,919 B2* | 7/2025 | Mahlmeister | A63F 13/497 |
| 2010/0031299 A1* | 2/2010 | Harrang | H04N 21/4363 |
| | | | 725/80 |
| 2011/0107220 A1* | 5/2011 | Perlman | H04N 21/2381 |
| | | | 715/720 |
| 2013/0124371 A1* | 5/2013 | Mehta | G06Q 30/06 |
| | | | 709/217 |
| 2013/0127877 A1* | 5/2013 | Blas, Jr. | G06T 13/00 |
| | | | 345/474 |
| 2013/0132839 A1* | 5/2013 | Berry | G11B 27/34 |
| | | | 715/719 |
| 2013/0150139 A1* | 6/2013 | Oakes | G07F 17/329 |
| | | | 463/16 |
| 2013/0159822 A1* | 6/2013 | Grossman | G06F 16/50 |
| | | | 715/201 |
| 2013/0260896 A1* | 10/2013 | Miura | A63F 13/47 |
| | | | 463/42 |
| 2013/0298026 A1* | 11/2013 | Fitzpatrick | H04N 21/44 |
| | | | 715/723 |
| 2013/0311561 A1* | 11/2013 | Ku | G11B 27/34 |
| | | | 709/204 |
| 2013/0339604 A1* | 12/2013 | Zuluaga | G06F 3/0605 |
| | | | 711/E12.017 |
| 2014/0052281 A1* | 2/2014 | Eronen | G06F 3/165 |
| | | | 700/94 |
| 2014/0053200 A1* | 2/2014 | de Paz | H04N 21/4756 |
| | | | 725/44 |
| 2014/0074952 A1* | 3/2014 | White | G06F 16/3344 |
| | | | 709/206 |
| 2014/0179427 A1* | 6/2014 | Miura | A63F 13/69 |
| | | | 463/31 |
| 2014/0179439 A1* | 6/2014 | Miura | A63F 13/53 |
| | | | 463/42 |
| 2014/0310601 A1* | 10/2014 | Matejka | H04N 21/8153 |
| | | | 715/720 |
| 2015/0081636 A1* | 3/2015 | Schindler | G06F 11/1482 |
| | | | 707/639 |
| 2015/0161141 A1* | 6/2015 | Evans | G06F 16/44 |
| | | | 715/243 |
| 2015/0201023 A1* | 7/2015 | Kotab | H04L 65/613 |
| | | | 709/208 |
| 2015/0367238 A1* | 12/2015 | Perrin | A63F 13/73 |
| | | | 463/29 |
| 2016/0011725 A1* | 1/2016 | D'Argenio | G06F 3/0482 |
| | | | 715/825 |
| 2016/0132780 A1* | 5/2016 | Aradhye | G06N 5/048 |
| | | | 706/52 |
| 2016/0184712 A1 | 6/2016 | Colenbrander | |
| 2017/0244959 A1* | 8/2017 | Ranjeet | G06T 7/292 |
| 2017/0311008 A1* | 10/2017 | Petersen | H04N 21/232 |
| 2017/0354884 A1* | 12/2017 | Benedetto | A63F 13/493 |
| 2017/0354888 A1* | 12/2017 | Benedetto | A63F 13/30 |
| 2017/0357465 A1* | 12/2017 | Dzeryn | G06F 3/0647 |
| 2018/0021684 A1* | 1/2018 | Benedetto | A63F 13/86 |
| | | | 463/24 |
| 2018/0039389 A1* | 2/2018 | Martyn | H04M 1/72469 |
| 2018/0132006 A1* | 5/2018 | Galant | G11B 27/105 |
| 2018/0154258 A1* | 6/2018 | Oiwa | A63F 13/49 |
| 2018/0227138 A1* | 8/2018 | Faulkner | H04L 12/1831 |
| 2018/0241849 A1* | 8/2018 | Edmiston | H04L 43/16 |
| 2018/0249113 A1* | 8/2018 | Faulkner | G11B 27/002 |
| 2019/0141415 A1* | 5/2019 | Tegethoff | G11B 27/28 |
| 2019/0270019 A1* | 9/2019 | Miura | H04N 21/4781 |
| 2020/0021870 A1* | 1/2020 | Lechtenberg | H04L 65/80 |
| 2020/0034023 A1* | 1/2020 | Sakaino | G06F 3/04817 |
| 2020/0404383 A1* | 12/2020 | Li | H04N 21/8455 |
| 2021/0011940 A1* | 1/2021 | Tang | G06F 16/535 |
| 2021/0203521 A1* | 7/2021 | Konda | H04L 67/025 |
| 2021/0216171 A1* | 7/2021 | Lockhart | G06F 3/04847 |
| 2021/0319663 A1* | 10/2021 | Russ | G07F 17/3223 |
| 2022/0080312 A1* | 3/2022 | Kobayashi | G06F 3/04842 |
| 2023/0315523 A1* | 10/2023 | Korupolu | G06F 9/4494 |
| | | | 718/104 |

FOREIGN PATENT DOCUMENTS

| | | |
|---|---|---|
| JP | 2018504193 A | 2/2018 |
| JP | 2020017232 A | 1/2020 |
| JP | 2020115252 A | 7/2020 |

* cited by examiner

FIG.6

| SAVE DATA | GAME PROGRAM | IMAGE | AUTOSAVE FLAG | TIME INFORMATION |
|---|---|---|---|---|
| SAVE DATA SA1 | GAME PROGRAM GA | IMAGE | 1 | 2021/01/20 16:45 |
| SAVE DATA SA2 | GAME PROGRAM GA | IMAGE | | 2021/01/20 16:45 |
| SAVE DATA SB1 | GAME PROGRAM GB | IMAGE | 1 | 2021/01/21 16:45 |
| SAVE DATA SB2 | GAME PROGRAM GB | IMAGE | | 2021/01/21 16:46 |
| SAVE DATA SB3 | GAME PROGRAM GB | IMAGE | | 2021/01/21 16:47 |
| SAVE DATA SB4 | GAME PROGRAM GB | IMAGE | | 2021/01/21 16:48 |
| SAVE DATA SB5 | GAME PROGRAM GB | IMAGE | | 2021/01/21 16:49 |
| ⋮ | ⋮ | ⋮ | ⋮ | ⋮ |

GAME SYSTEM THAT ALLOWS IMPROVEMENT IN CONVENIENCE OF USER IN SELECTION OF GAME, NON-TRANSITORY STORAGE MEDIUM ENCODED WITH COMPUTER READABLE INFORMATION PROCESSING PROGRAM, AND INFORMATION PROCESSING METHOD

This nonprovisional application claims priority on Japanese Patent Application No. 2022-192979 filed on Dec. 1, 2022 with the Japan Patent Office, the entire contents of which are hereby incorporated by reference.

FIELD

The present disclosure relates to a game system and particularly to a screen for selecting a game.

BACKGROUND AND SUMMARY

Conventionally, which game to be played can be selected in a game selection screen of a game device. As a user performs an operation to instruct start of execution of a specific game, that game is launched.

In a screen for selecting a game to be played from now, a list of images of game titles, a single image for a single game title, is shown to allow a user to select a game to be played.

An object of the present disclosure is to provide a game system that allows improvement in convenience of a user in selection of a game, a non-transitory storage medium encoded with a computer readable information processing program, and an information processing method.

A game system according to an example of the present disclosure includes at least one computer, a first storage configured to store a plurality of game programs, and a second storage configured to store save data of the plurality of game programs and to store a plurality of pieces of save data for at least one game program. The computer executes at least one game program among the plurality of game programs stored in the first storage, causes the second storage to store save data of the game program that is being executed, based on a status of execution of the game program, causes a display to show a list of information corresponding to save data for each piece of save data of the game program for which a plurality of pieces of save data are stored, among pieces of save data of the plurality of game programs stored in the second storage, and selects information corresponding to one piece of save data from the shown list of information corresponding to the pieces of save data shown on the display, based on an operation input from a user. To execute a game program includes to execute a corresponding game program based on save data in response to selection of information corresponding to the save data. According to this configuration, in selection of a game, a list of information corresponding to save data for each piece of save data of a game program for which a plurality of pieces of save data have been stored is shown on the display. Therefore, user's convenience can be improved.

In the exemplary embodiment, to cause the second storage to store save data further includes to cause the second storage to store, together with the save data, an image showing a status of progress of game play corresponding to that save data, and to cause a display to show a list of information causes the display to show, as the information corresponding to the save data, a list of images showing statuses of progress of game play corresponding to that save data. According to this configuration, the user can instantaneously and exhaustively check statuses of progress in the past for each of a plurality of game plays so that user's convenience is improved.

In the exemplary embodiment, to cause a display to show a list of information includes to cause the display to show a list of information corresponding to a plurality of pieces of save data, as being arranged for each corresponding game program. According to this configuration, since information corresponding to save data is arranged for each corresponding game program, the user can instantaneously and exhaustively check relationship between the information corresponding to save data and the corresponding game program so that user's convenience is improved.

In the exemplary embodiment, to cause a display to show a list of information includes to cause the display to show, together with the information corresponding to the save data arranged for each game program, information indicating the game program. According to this configuration, representation of information indicating the game program, together with information corresponding to save data, lessens burdens imposed in selection of a game by the user so that user's convenience is improved.

In the exemplary embodiment, the information indicating the game program includes an image associated with contents of the game program. According to this configuration, a game can easily be selected owing to the image associated with contents of the game program. Burdens imposed in selection by the user are lessened and user's convenience is improved.

In the exemplary embodiment, to execute a game program includes to execute a corresponding game program in response to selection of the information indicating the game program, without using save data stored in the second storage. According to this configuration, since the game program can be executed without using save data, convenience of the user who desires to play a game from an initial state is improved.

In the exemplary embodiment, the information indicating the game program includes an image of a screen showing a title of the game program. According to this configuration, a game can easily be selected with the use of the image of the screen showing the title so that burdens imposed in selection by the user are lessened and user's convenience is improved.

In the exemplary embodiment, to cause the second storage to store save data includes to cause the second storage to store save data of the game program that is being executed, automatically or based on an operation input from the user, and the information corresponding to the save data includes information indicating that save data has automatically been stored in the second storage. According to this configuration, whether or not save data is save data automatically stored in the second storage can readily be identified so that burdens imposed in selection by the user are lessened and user's convenience is improved.

In the exemplary embodiment, to cause the second storage to store save data includes to disallow storage in the second storage, of new save data of the game program that is being executed when the number of all pieces of save data for the plurality of game programs stored in the second storage has reached a predetermined upper limit number. According to this configuration, an upper limit of the number of all pieces of save data for the plurality of game programs is determined in advance. Therefore, since it is not that the upper limit number of individual game programs is set, save data can be stored in accordance with the user's preference and user's convenience is improved. According to this configuration, as the upper limit number of pieces of save data is set for all pieces of save data for the plurality of game programs stored in the second storage, a storage area for save data does not have to be set for each of the plurality of game programs regardless of the user's preference, and a storage capacity of the second storage necessary for storage of save data can be reduced.

In the exemplary embodiment, to cause the second storage to store save data includes to disallow storage in the second storage, of new save data of the game program that is being executed when a data capacity for all pieces of save data for the plurality of game programs stored in the second storage has reached a predetermined upper limit capacity. According to this configuration, the upper limit of the data capacity for all pieces of save data for the plurality of game programs is set in advance. Therefore, since it is not that the upper limit capacity is set for an individual game program, save data can be stored in accordance with the user's preference and user's convenience is improved. According to this configuration, as the upper limit of the data capacity for save data is set for all pieces of save data for the plurality of game programs stored in the second storage, a storage area for save data does not have to be set for each of the plurality of game programs regardless of the user's preference, and a storage capacity of the second storage necessary for storage of save data can be reduced.

In the exemplary embodiment, to cause a display to show a list of information includes to allocate, for each game program, a prescribed area where the display is caused to show a list of information corresponding to save data and to cause a list of information corresponding to the save data for each piece of save data of the corresponding game program to be shown in each area. According to this configuration, whether there is a large or small number of pieces of save data for each game can readily be identified. Burdens imposed in selection by the user are lessened and user's convenience is improved.

A non-transitory storage medium according to the present disclosure is a non-transitory storage medium encoded with a computer readable information processing program executed by a computer of a game system, the game system including a first storage configured to store a plurality of game programs and a second storage configured to store save data of the plurality of game programs and to store a plurality of pieces of save data for at least one game program, at least one computer being configured to perform operations including executing at least one game program among the plurality of game programs stored in the first storage, causing the second storage to store save data of the game program that is being executed, based on a status of execution of the game program, causing a display to show a list of information corresponding to save data for each piece of save data of the game program for which a plurality of pieces of save data are stored, among pieces of save data of the plurality of game programs stored in the second storage, selecting information corresponding to one piece of save data from the shown list of information corresponding to the pieces of save data shown on the display, based on an operation input from a user, and executing the corresponding game program based on the save data in response to selection of the information corresponding to the save data. According to this configuration, in selection of a game, a list of information corresponding to save data for each piece of save data of a game program for which a plurality of pieces of save data have been stored is shown on the display. Therefore, user's convenience can be improved.

In the exemplary embodiment, the causing the second storage to store save data further includes causing the second storage to store, together with the save data, an image showing a status of progress of game play corresponding to that save data, and the causing a display to show a list of information includes causing the display to show, as the information corresponding to the save data, a list of images showing statuses of progress of game play corresponding to that save data. According to this configuration, the user can instantaneously and exhaustively check statuses of progress in the past for each of a plurality of game plays so that user's convenience is improved.

In the exemplary embodiment, the causing a display to show a list of information includes causing the display to show a list of information corresponding to a plurality of pieces of save data, as being arranged for each corresponding game program. According to this configuration, since information corresponding to save data is arranged for each corresponding game program, the user can instantaneously and exhaustively check relationship between the information corresponding to save data and the corresponding game program so that user's convenience is improved.

In the exemplary embodiment, the causing a display to show a list of information includes causing the display to show, together with the information corresponding to the save data arranged for each game program, information indicating the game program. According to this configuration, representation of information indicating the game program, together with information corresponding to save data, lessens burdens imposed in selection of a game by the user so that user's convenience is improved.

In the exemplary embodiment, the information indicating the game program includes an image associated with contents of the game program. According to this configuration, a game can easily be selected owing to the image associated with contents of the game program. Burdens imposed in selection by the user are lessened and user's convenience is improved.

In the exemplary embodiment, the executing the game program includes executing a corresponding game program in response to selection of the information indicating the game program, without using save data stored in the second storage. According to this configuration, since the game program can be executed without using save data, convenience of the user who desires to play a game from an initial state is improved.

In the exemplary embodiment, the information indicating the game program includes an image of a screen showing a title of the game program. According to this configuration, a game can easily be selected with the use of the image of the screen showing the title so that burdens imposed in selection by the user are lessened and user's convenience is improved.

In the exemplary embodiment, the causing the second storage to store save data includes causing the second storage to store save data of the game program that is being executed, automatically or based on an operation input from the user, and the information corresponding to the save data includes information indicating that save data has automatically been stored in the second storage. According to this configuration, whether or not save data is save data automatically stored in the second storage can readily be identified so that burdens imposed in selection by the user are lessened and user's convenience is improved.

In the exemplary embodiment, the causing the second storage to store save data includes disallowing storage in the second storage, of new save data of the game program that is being executed when a data capacity for all pieces of save data for the plurality of game programs stored in the second storage has reached a predetermined upper limit capacity. According to this configuration, the upper limit of the data capacity for all pieces of save data for the plurality of game programs is set in advance. Therefore, since it is not that the upper limit capacity is set for an individual game program, save data can be stored in accordance with the user's preference and user's convenience is improved. According to this configuration, as the upper limit of the data capacity for save data is set for all pieces of save data for the plurality of game programs stored in the second storage, a storage area for save data does not have to be set for each of the plurality of game programs regardless of the user's preference, and a storage capacity of the second storage necessary for storage of save data can be reduced.

In the exemplary embodiment, the causing the display to show a list of information includes allocating for each game program, a prescribed area where the display is caused to show a list of information corresponding to save data and causing a list of information corresponding to the save data for each piece of save data of the corresponding game program to be shown in each area. According to this configuration, whether there is a large or small number of pieces of save data for each game can readily be identified. Burdens imposed in selection by the user are lessened and user's convenience is improved.

An information processing method according to an example of the present disclosure includes executing at least one game program among a plurality of game programs stored in a first storage, causing a second storage to store save data of a game program that is being executed, based on a status of execution, causing a display to show a list of information corresponding to the save data for each piece of save data of a game program for which a plurality of pieces of save data are stored, among pieces of save data of the plurality of game programs stored in the second storage, and selecting information corresponding to one piece of save data from the shown list of information corresponding to the save data shown on the display, based on an operation input from a user. The executing a game program includes executing a corresponding game program based on the save data in response to selection of the information corresponding to the save data. According to this configuration, in selection of a game, a list of information corresponding to save data for each piece of save data of a game program for which a plurality of pieces of save data have been stored is shown on the display. Therefore, user's convenience can be improved.

In the exemplary embodiment, the causing a display to show a list of information includes arranging information corresponding to a plurality of pieces of save data for each corresponding game program and causing the display to show, together with the information corresponding to the save data, information indicating the game program. According to this configuration, representation of information indicating the game program, together with information corresponding to save data, lessens burdens imposed in selection of a game by the user so that user's convenience is improved.

In the exemplary embodiment, the executing a game program includes executing a corresponding game program in response to selection of the information indicating the game program, without using the save data stored in the second storage. According to this configuration, since the game program can be executed without using save data, convenience of the user who desires to play a game from an initial state is improved.

In the exemplary embodiment, the causing a second storage to store save data includes disallowing storage in the second storage, of new save data of the game program that is being executed when a data capacity for all pieces of save data for the plurality of game programs stored in the second storage has reached a predetermined upper limit capacity. According to this configuration, the upper limit of the data capacity for all pieces of save data for the plurality of game programs is set in advance. Therefore, since it is not that the upper limit capacity is set for an individual game program, save data can be stored in accordance with the user's preference and user's convenience is improved. According to this configuration, as the upper limit of the data capacity for save data is set for all pieces of save data for the plurality of game programs stored in the second storage, a storage area for save data does not have to be set for each of the plurality of game programs regardless of the user's preference, and a storage capacity of the second storage necessary for storage of save data can be reduced.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 shows an exemplary illustrative non-limiting drawing of a configuration of save data stored in a second storage 21 based on the embodiment.

DETAILED DESCRIPTION OF NON-LIMITING EXAMPLE EMBODIMENTS

Figure 1:
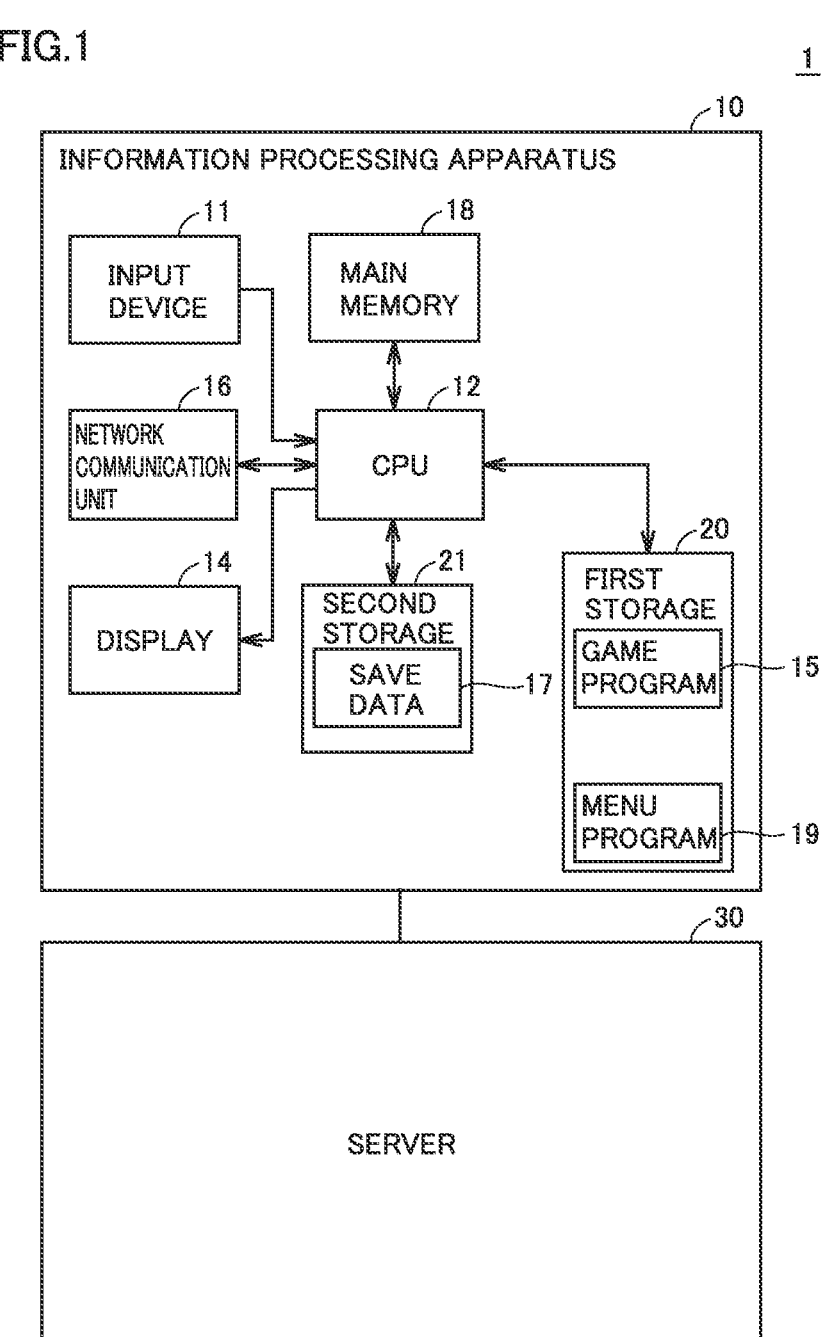
FIG. 1 shows an exemplary illustrative non-limiting drawing of an overview of a configuration of an information processing system 1 based on an embodiment.

This embodiment will be described in detail with reference to the drawings. The same or corresponding elements in the drawings have the same reference characters allotted and description thereof will not be repeated.

[A. Configuration of Information Processing System]

FIG. 1 is a diagram illustrating an overview of a configuration of an information processing system 1 based on an embodiment.

Referring to FIG. 1, information processing system 1 includes a server 30 and an information processing apparatus 10 provided to communicate with server 30.

By way of example, a configuration where information processing apparatus 10 based on the embodiment is mounted as a game device will be described.

Information processing apparatus 10 is any computer. Information processing apparatus 10 may be, for example, a portable (also referred to as mobile) device such as a portable game device, a portable telephone, or a smartphone, a stationary apparatus such as a personal computer or a home game console, or a large apparatus such as an arcade game machine for a commercial purpose.

A hardware configuration of information processing apparatus 10 is outlined below.

Information processing apparatus 10 includes a CPU 12 and a main memory 18. CPU 12 is an information processor that performs various types of information processing in information processing apparatus 10. CPU 12 performs the various types of information processing by using main memory 18.

Information processing apparatus 10 includes a first storage 20 and a second storage 21. Various programs (which may include not only a game program 15 and a menu program 19 but also an operating system) executed in information processing apparatus 10 are stored in first storage 20.

Save data 17 is stored in second storage 21. Any storage (storage medium) accessible by CPU 12 is adopted as first storage 20 and second storage 21. For example, a storage embedded in information processing apparatus 10 such as a hard disk or a memory, a storage medium attachable to and removable from information processing apparatus 10 such as an optical disc or a cartridge, or combination of a storage and a storage medium as such may be adopted as first storage 20 and second storage 21. In such a case, a game system representing an exemplary information processing system including information processing apparatus 10 and any storage medium may be configured. First storage 20 and second storage 21 may be provided as a single storage.

Game program 15 includes computer-readable instructions for performing information processing as will be described later. The game program may also include a program that establishes data communication with server 30 and a program that establishes data communication with another information processing apparatus as a part of game processing. In the present example, a plurality of game programs 15 are stored in first storage 20.

Save data 17 of the plurality of game programs is stored in second storage 21. In the present example, a plurality of pieces of save data 17 are stored for at least one game program.

By executing menu program 19, information processing apparatus 10 shows a menu screen which will be described later.

Information processing apparatus 10 includes an input device 11 that accepts an instruction from a user, such as an analog stick, a button, or a touch panel. Information processing apparatus 10 includes a display 14 that shows an image generated through information processing. Without being limited to the configuration, various input forms and representation forms can be adopted.

Information processing apparatus 10 includes a network communication unit 16. Network communication unit 16 may be connected to a not-shown network and may perform processing for data communication with an external apparatus (for example, server 30 or another information processing apparatus).

Information processing apparatus 10 may be implemented by a plurality of apparatuses. For example, information processing apparatus 10 may be implemented by a main body apparatus including CPU 12 and an apparatus including input device 11 and/or display 14, which are separate from each other. For example, in another embodiment, information processing apparatus 10 may be implemented by a main body apparatus and a terminal device including input device 11 and display 14, or by a main body apparatus and an operation apparatus including input device 11. Information processing apparatus 10 may employ a television as a display apparatus, without including display 14.

In another embodiment, at least some of information processing performed in information processing apparatus 10 may be performed as being distributed among a plurality of apparatuses that can communicate over a network (a wide range network and/or a local network). Specifically, server 30 may perform at least some of information processing performed by information processing apparatus 10.

[B. Functional Configuration of Information Processing Apparatus 10]

Figure 2:
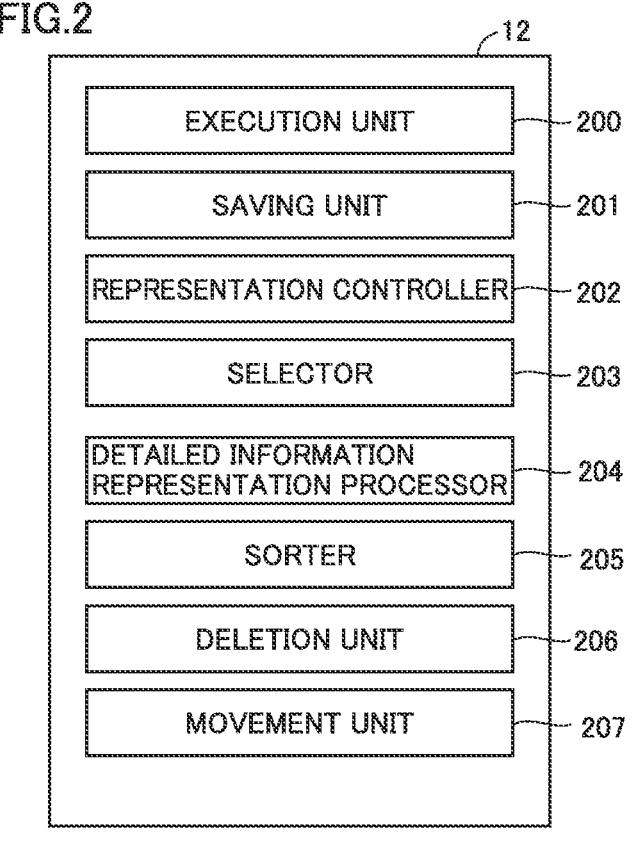
FIG. 2 shows an exemplary illustrative non-limiting drawing of a functional block of an information processing apparatus 10 based on the embodiment.

FIG. 2 is a diagram illustrating a functional block of information processing apparatus 10 based on the embodiment. Referring to FIG. 2, CPU 12 of information processing apparatus 10 implements various functional blocks by reading menu program 19.

CPU 12 includes an execution unit 200, a saving unit 201, a representation controller 202, a selector 203, a detailed information representation processor 204, a sorter 205, a deletion unit 206, and a movement unit 207.

Execution unit 200 executes at least one game program 15 among the plurality of game programs 15 stored in first storage 20. In response to selection of information corresponding to save data 17 by selector 203, execution unit 200 executes corresponding game program 15 based on save data 17.

Saving unit 201 has second storage 21 store, based on a status of execution by execution unit 200, save data 17 of game program 15 that is being executed, automatically or based on an operation input from a user. Saving unit 201 further has second storage 21 store, together with save data 17, an image showing a status of progress of game play corresponding to that save data 17. When a data capacity for all pieces of save data 17 for the plurality of game programs 15 stored in second storage 21 has reached a predetermined upper limit, saving unit 201 may disallow storage in second storage 21, of new save data 17 of game program 15 that is being executed, based on the status of execution by execution unit 200. Specifically, when the number of all pieces of save data 17 of the plurality of game programs 15 stored in second storage 21 has reached a predetermined upper limit number, saving unit 201 may disallow storage in second storage 21, of new save data 17 of game program 15 that is being executed, based on the status of execution by execution unit 200.

Representation controller 202 controls display 14 to show a list of corresponding information for each piece of save data 17 of game program 15 for which a plurality of pieces of save data 17 have been stored, among pieces of save data 17 of the plurality of game programs 15 stored in second storage 21. Representation controller 202 controls display 14 to show a list of images showing statuses of progress of game play corresponding to save data 17, as information corresponding to that save data. Representation controller 202 controls display 14 to show the list of information corresponding to the plurality of pieces of save data 17, as being arranged for each corresponding game program 15. Representation controller 202 controls display 14 to show information indicating game program 15, together with information corresponding to save data 17 arranged for each game program 15. The information indicating the game program may be an image associated with contents of the game program. For example, the image associated with the contents of the game program may include a character or a landscape that appears in the game program. The information corresponding to save data may include information indicating that the save data has automatically been stored in second storage 21. Representation controller 202 allocates, for each game program 15, a prescribed area where display 14 shows the list of information corresponding to save data, and controls display 14 to show in each area, the list of corresponding information on corresponding game program 15 for each piece of save data 17.

Selector 203 selects information corresponding to single game program 15 or single piece of save data 17 from the list of information corresponding to save data 17 shown on display 14, based on an operation input from the user.

In response to selection of information indicating game program 15 by selector 203, execution unit 200 executes corresponding game program 15 without using save data 17 stored in second storage 21. The information indicating the game program may be an image of a screen showing a title of the game program.

Detailed information representation processor 204 performs detailed information representation processing. Detailed information representation processor 204 has an object or the like representing detailed information shown on a menu screen 300, based on meta information or the like of the game program.

Sorter 205 performs representation order changing processing for changing a sorting rule.

Deletion unit 206 performs processing for deleting data.

Movement unit 207 performs movement processing for changing a position where an image showing a status of progress of game play corresponding to save data is shown and a position where an image associated with the contents of the game program is shown.

[C. Overview of Menu Screen]

A menu screen provided as a result of execution of menu program 19 based on the embodiment will now be outlined.

Figure 3:
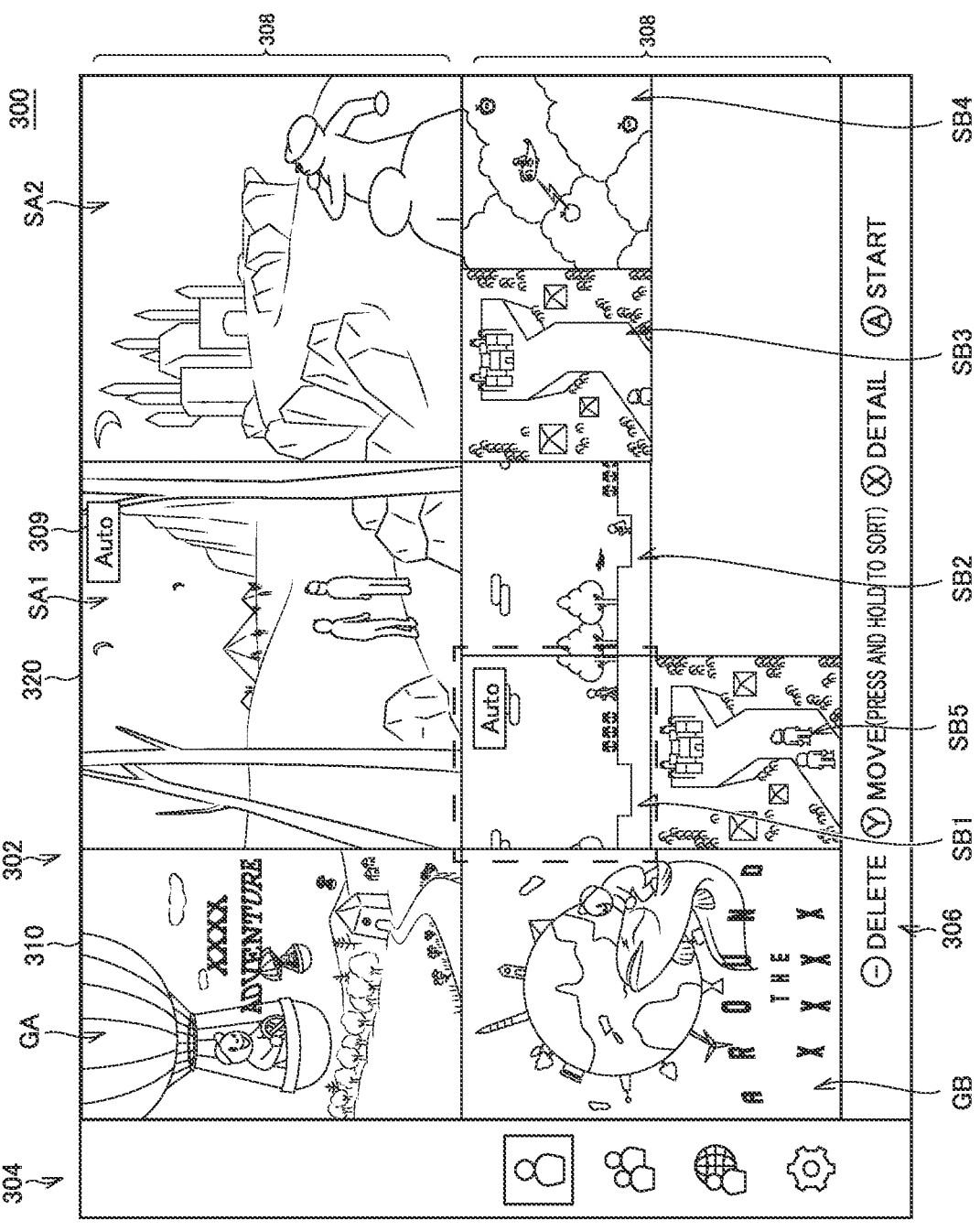
FIG. 3 shows an exemplary illustrative non-limiting drawing of an exemplary menu screen 300 provided by information processing system 1 according to the embodiment.

FIG. 3 is a schematic diagram showing exemplary menu screen 300 provided by information processing system 1 according to the embodiment.

Referring to FIG. 3, menu screen 300 includes a menu area 302 and a menu operation reception area 304. In menu area 302, a game-program-associated image 310 that graphically expresses each game program 15 and a game play image 320 that graphically expresses save data 17 of each game program are shown as being aligned. In menu operation reception area 304, an icon for selecting the number of persons (one) to play a game, an icon for selecting the number of persons (two) to play a game, an icon for selecting match against each other through communication by establishment of connection to a network, a setting icon, and the like are shown. In the present example, an example where the icon for selecting the number of persons (one) to play a game is selected is shown.

The term "icon" herein encompasses an image that explicitly or implicitly indicates association with a program, and a size or contents of the image is/are not limited. The term "icon" may include not only a still image but also moving images.

In an example where game program 15 is a program sold in the past, game-program-associated image 310 corresponding to game program 15 may be an image of a package of the game program sold in the past. For example, an example in which a game program was sold in the past in such a form that a storage medium such as a dedicated memory card is packed in a package and the game program is provided as being distributed to a game system is assumed. In such a case, as an image that graphically expresses the package is used, the user can know the kind of an application at a glance. Game-program-associated image 310 corresponding to game program 15 may be an image of a screen showing the title of the game program.

In menu area 302, two rows 308 corresponding to respective game-program-associated images 310 are defined. In a top or bottom row 308, some of game-program-associated images 310 or game play images 320 may not be shown. Menu area 302 is not limited to two rows 308, but a single row 308 or three or more rows 308 may be provided.

Game play images 320 shown in a list in menu area 302 are each shown, with a size thereof being adjusted depending on relation with another game play image 320 belonging to the same row 308.

Though a length (which is referred to as a "height" for the sake of convenience below) in a portrait orientation (which is referred to as a "height direction" for the sake of convenience below) of the sheet plane of row 308 in menu area 302 is constant, the height may be changed.

In showing in menu area 302, a list of images showing statuses of progress of game play corresponding to save data, information processing system 1 according to the present embodiment performs a function to optimize a size of a shown image that represents the status of progress of game play corresponding to each piece of save data.

In the present example, by way of example, an example in which game-program-associated image 310 of a game program GA is arranged in top row 308 is shown. In a left part of row 308, game-program-associated image 310 showing an image of a package of game program GA is arranged, and on the right thereof, a list of game play images 320 representing save data SA1 and SA2 is shown.

An example in which game-program-associated image 310 of a game program GB is arranged in bottom row 308 is shown. In the left part of row 308, game-program-associated image 310 showing an image of a package of game program GB is arranged, and on the right thereof, game play images 320 representing save data SB1 to SB5 are shown in a list.

In the present example, a list of images showing statuses of progress of game play corresponding to save data is shown as game play images 320, as information corresponding to the save data, so that the user can instantaneously and exhaustively check statuses of play in the past for each of the plurality of game programs and user's convenience is improved.

In the present example, a game program and corresponding save data are arranged in the same row 308. In other words, they are shown in a list collectively for each game program, which facilitates view by the user. Therefore, burdens imposed on the user in selection of data can be lessened and convenience is improved.

In the present example, since game-program-associated image 310 showing the image of the package including a name of the game is arranged in the left part of row 308, from which game save data is derived can readily be known, which facilitates view by the user. Therefore, burdens imposed on the user in selection of data can be lessened and convenience is improved. In the present example, game-program-associated image 310 includes a character or a landscape that appears in the game program. Therefore, the user can readily know contents of the game and convenience is improved.

In the present example, an example in which a special object 309 "AUTO" indicating that save data SA1 of game program GA and save data SB1 of game program GB1 result from an automatic saving function is added to (superimposed on) save data SA1 and save data SB1 is shown. As special object 309 is added (superimposed), save data based on the autosave function can readily be known, which facilitates view by the user. Therefore, burdens imposed on the user in selection of data can be lessened and convenience is improved.

By operating input device 11, the user can select any game-program-associated image 310 or game play image 320 among game-program-associated images 310 or game play images 320 shown in the list.

An exemplary state in which game-program-associated image 310 or game play image 320 shown in menu area 302 is selected is shown. By way of example, a state in which game play image 320 of save data SB1 is selected is shown. Though an example in which selection is shown with a dotted line is described in the present example, without being limited as such, while game-program-associated image 310 or game play image 320 is selected, selection of game-program-associated image 310 or game play image 320 may be shown by enlarged representation. As the user further performs an operation while game-program-associated image 310 or game play image 320 is selected, a position of selected game-program-associated image 310 or game play image 320 can be changed. Positions or the order of game play images 320 which fall(s) under information corresponding to save data SA1 to SA2 and save data SB1 to SB5 can freely be changed, or positions or the order of game-program-associated images 310 showing game program GA and game program GB can also freely be changed based on an operation input from the user. A size of each of game play images 320 which fall under information corresponding to save data SA1 to SA2 and save data SB1 to SB5 may be increased or reduced based on an operation input from the user so long as the height of row 308 in menu area 302 is not exceeded.

An operation instruction image 306 is also shown under menu area 302. Operation instruction image 306 shows an operation by the user onto a group of operation buttons of input device 11 and corresponding processing contents. Specifically, as a specific operation button (corresponding to "-") in the group of operation buttons of input device 11 is operated, game-program-associated image 310 or game program 320 shown in a list in menu area 302 is deleted.

As a specific operation button (corresponding to "Y") in the group of operation buttons of input device 11 is operated, a position on menu area 302, where the image showing the status of progress of game play corresponding to save data is shown and a position on menu area 302, where the image associated with contents of the game program is shown are changed (corresponding to processing for "move"). In other words, contents shown in menu area 302 are scrolled.

As the specific operation button (corresponding to "Y") in the group of operation buttons of input device 11 is pressed and held, a rule for sorting game-program-associated images 310 shown in the list in menu area 302 is changed (corresponding to processing for "sort"). Examples of the sorting rule include the name of the title, date of distribution, date of sales, and a distributor in addition to customization freely designated by the user. Furthermore, sorting may be done based on the number of times of distribution, the number of likes, the number of players, rating, the number of times of selection of each game program by users, or time and date of last selection of each game program by a user. One or more of the rules as described above should only be adopted as the sorting rule. As the specific operation button (corresponding to "Y") in the group of operation buttons of input device 11 is pressed and held, the rule for sorting game play images 320 in addition to game-program-associated images 310 may be changed. Examples of the sorting rule include the number of times of selection by the user of each game play image 320 and time and date of last selection of each game play image 320 by a user in addition to customization freely designated by the user. One or more of the rules as described above should only be adopted as the sorting rule.

As a specific operation button (corresponding to "X") in the group of operation buttons of input device 11 is operated, detailed information on a program corresponding to an image showing a status of progress of game play corresponding to save data selected in menu area 302 and an image associated with contents of the game program is shown (corresponding to processing for "detail"). An object or the like showing detailed information is shown on menu screen 300 based on meta information or the like of the game program corresponding to selected game play image 320.

As a specific operation button (corresponding to "A") in the group of operation buttons of input device 11 is operated, execution of a program corresponding to game play image 320 selected in menu area 302 is started (corresponding to processing for "start").

In selection of a game program to be played, menu screen 300 according to the embodiment shows a list of a plurality of pieces of save data corresponding to a plurality of game programs.

Therefore, in selection of a game program, a user can consider which save data of the plurality of pieces of save data is to be used for play and hence convenience is improved. Furthermore, the user does not have to select, after the user selects a game program, save data corresponding to the game program. Since save data can also be selected in selection of a game program, workloads imposed on the user are lessened and convenience is improved.

Figure 4:
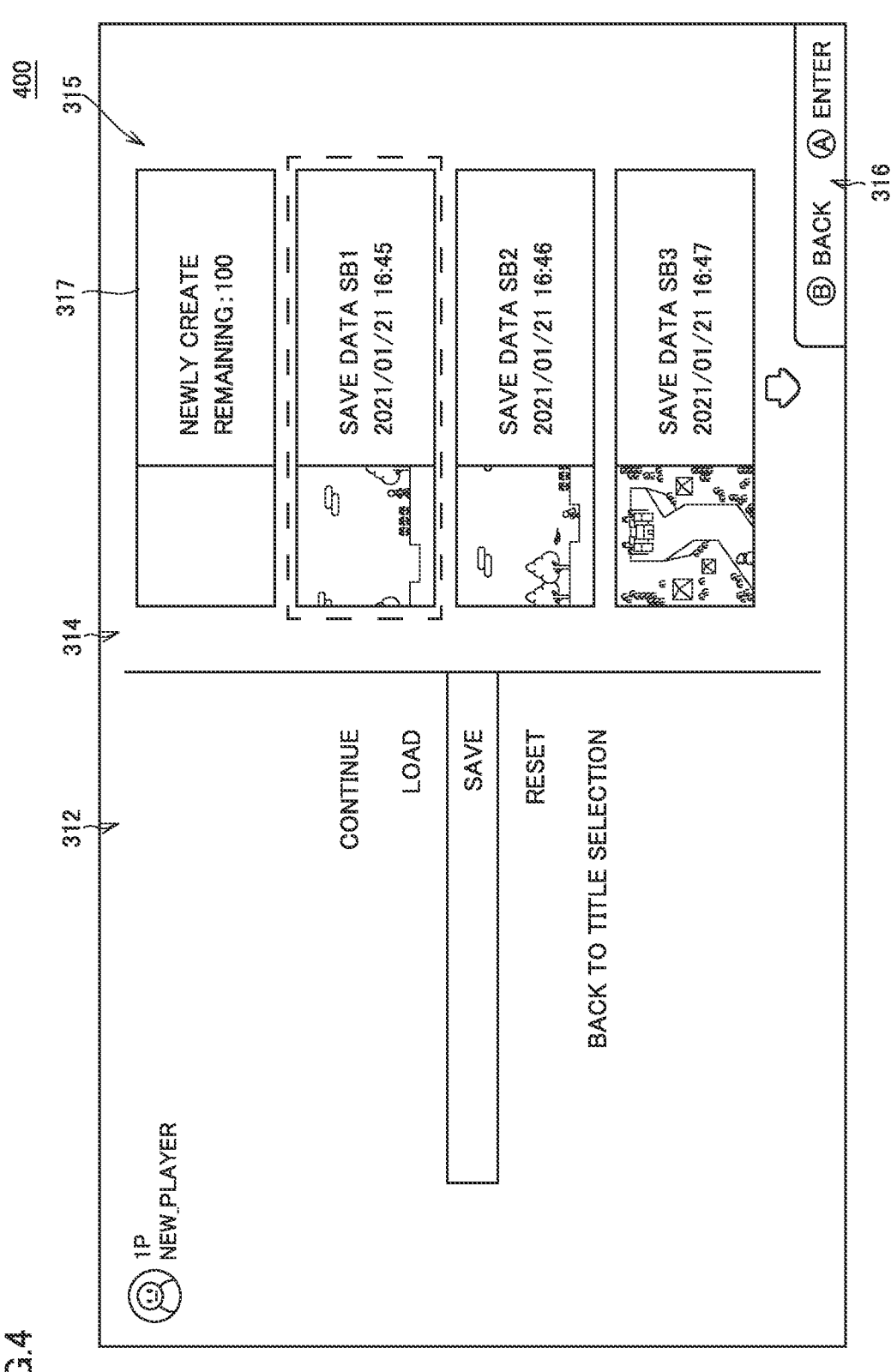
FIG. 4 shows an exemplary illustrative non-limiting drawing of an exemplary suspension menu screen 400 according to the embodiment.

FIG. 4 is a schematic diagram showing an exemplary suspension menu screen 400 according to the embodiment.

Referring to FIG. 4, suspension menu screen 400 includes a selection area 314 and an operation reception area 312.

In the present example, a suspension function to temporarily suspend a status of progress of a game while a game program is being executed is provided. Specifically, as a specific operation button (for example, a suspension button) in the group of operation buttons of input device 11 is operated, a suspension menu screen is shown. The suspension menu screen may be shown based on a combination of a plurality of buttons in the group of operation buttons without being limited to the specific operation button, or the suspension menu screen may be shown based on combination of the specific operation button and an operation input (an operation onto a cross-shaped key).

In operation reception area 312, items "continue", "load", "save", "reset", and "back to title selection" are provided. The user can select each item by providing a specific operation input onto input device 11 (an operation onto the cross-shaped key). The present example shows an example where the item "save" is selected.

In selection area 314, icons 315 that graphically express save data 17 are shown as being aligned.

An icon 317 at the top in selection area 314 is an icon indicating an empty slot for save data. For example, as a cursor is moved over the icon and a specific operation button (corresponding to "A") in the group of operation buttons of input device 11 is operated, icon 315 corresponding to save data is added to selection area 314, the save data is stored, data is further stored, and the number of empty slots is decreased. The present example shows an example where one hundred pieces of save data can newly be created. Other icons 315 show a list of pieces of already stored save data. Specifically, icons 315 for save data SB1 to SB3 are shown. As the cursor is moved over a position of another icon to give an instruction for storage, save data is stored in the slot by overwriting. In this case, the number of new slots is not changed.

Icon 315 is composed of a screenshot image resulting from capturing of a game screen and information on time at the time of saving.

As the user moves the cursor over the item "continue" and operates the specific operation button (corresponding to "A") in the group of operation buttons of input device 11, processing in the suspension menu screen ends and the process returns to game processing.

As the user moves the cursor over the item "reset" and operates the specific operation button (corresponding to "A") in the group of operation buttons of input device 11, processing for resetting the status of progress of the game is performed. In this case, for example, the screen showing the title of the game is shown.

As the user moves the cursor over the item "back to title selection" and operates the specific operation button (corresponding to "A") in the group of operation buttons of input device 11, processing in the suspension menu screen ends and game processing ends. The screen returns to the menu screen described with reference to FIG. 3.

The present example shows an example where the item "save" is selected.

As the user moves the cursor over the item "save" and operates the specific operation button (corresponding to "A") in the group of operation buttons of input device 11, the user can select an icon in selection area 314 on the right.

An operation instruction image 316 is also shown under selection area 314. Operation instruction image 316 shows an operation to be performed by the user onto the group of operation buttons of input device 11 and corresponding processing contents. Specifically, the specific operation button (corresponding to "A") in the group of operation buttons of input device 11 is operated to determine processing in connection with the selected icon. As a specific operation button (corresponding to "B") in the group of operation buttons of input device 11 is operated, the process returns to immediately preceding processing. In other words, the user is allowed to select an item in operation reception area 312.

Figure 5:
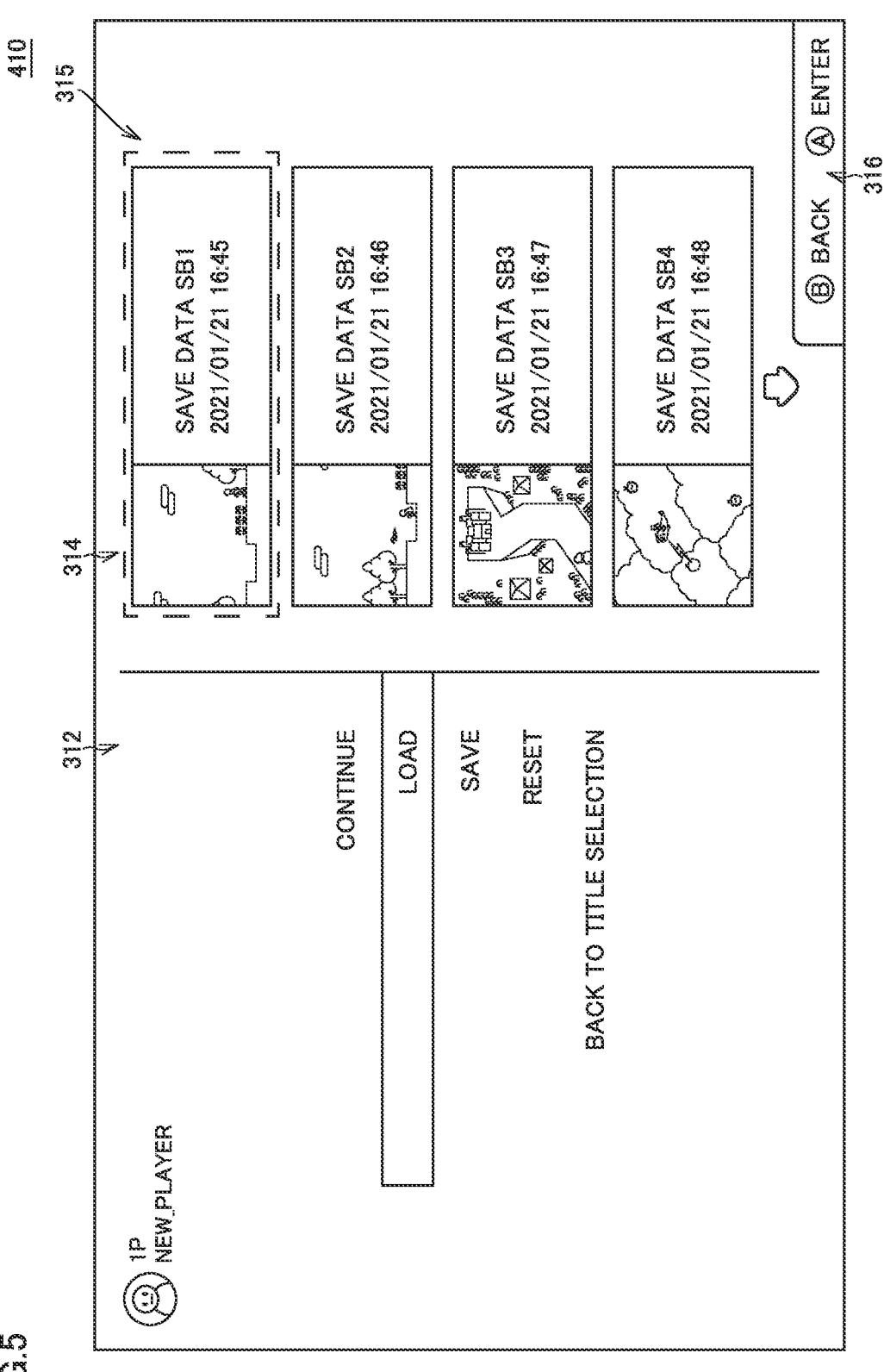
FIG. 5 shows an exemplary illustrative non-limiting drawing of another exemplary suspension menu screen 410 according to the embodiment.

FIG. 5 is a schematic diagram showing another exemplary suspension menu screen 410 according to the embodiment.

Referring to FIG. 5, suspension menu screen 410 includes selection area 314 and operation reception area 312.

In operation reception area 312, items "continue", "load", "save", "reset", and "back to title selection" are provided. The user can select each item by providing a specific operation input onto input device 11 (an operation onto the cross-shaped key). The present example shows an example where the item "load" is selected.

As the user moves the cursor over the item "load" and operates the specific operation button (corresponding to "A") in the group of operation buttons of input device 11, the user can select an icon in selection area 314 on the right.

In selection area 314, icons 315 that graphically express save data 17 are shown as being aligned.

Icons 315 show a list of pieces of already stored save data. Specifically, icons 315 of save data SB1 to SB4 are shown.

As the cursor is moved over a position of the icon and a specific operation button (corresponding to "A") in the group of operation buttons of input device 11 is operated, processing for loading save data is performed.

Specifically, game processing using the save data is performed.

[D. Exemplary Data Configuration]

FIG. 6 is a diagram illustrating a configuration of save data stored in second storage 21 based on the embodiment.

Referring to FIG. 6, an example where a plurality of pieces of save data are stored in second storage 21 is shown.

Specifically, an example where pieces of save data SA1, SA2, and SB1 to SB5 are stored is shown.

An example where save data SA1 is brought in correspondence with game program GA and with an image and an autosave flag ("1") is shown. The image is a screenshot image resulting from capturing of a game screen at the time of saving. Information on time at the time of saving is also stored together with the image.

An example where save data SA2 is brought in correspondence with game program GA and with an image and an autosave flag (none) is shown. The image is a screenshot image resulting from capturing of a game screen at the time of saving. Information on time at the time of saving is also stored together with the image.

An example where save data SB1 is brought in correspondence with game program GB and with an image and an autosave flag ("1") is shown. The image is a screenshot image resulting from capturing of a game screen at the time of saving. Information on time at the time of saving is also stored together with the image.

An example where save data SB2 is brought in correspondence with game program GB and with an image and an autosave flag (none) is shown. The image is a screenshot image resulting from capturing of a game screen at the time of saving. Information on time at the time of saving is also stored together with the image.

An example where save data SB3 is brought in correspondence with game program GB and with an image and an autosave flag (none) is shown. The image is a screenshot image resulting from capturing of a game screen at the time of saving. Information on time at the time of saving is also stored together with the image.

An example where save data SB4 is brought in correspondence with game program GB and with an image and an autosave flag (none) is shown. The image is a screenshot image resulting from capturing of a game screen at the time of saving. Information on time at the time of saving is also stored together with the image.

An example where save data SB5 is brought in correspondence with game program GB and with an image and an autosave flag (none) is shown. The image is a screenshot image resulting from capturing of a game screen at the time of saving. Information on time at the time of saving is also stored together with the image.

Though relation of each piece of save data with another piece of information is described with the use of a table structure by way of example in the present example, the table structure does not particularly have to be used, but relationship with another piece of information may be held, for example, as meta information.

[E. Processing Procedure in Information Processing]

A processing procedure in information processing provided by execution of menu program 19 or the like based on the embodiment will now be described. Each step is performed by execution of menu program 19 or the like by CPU 12.

Figure 7:
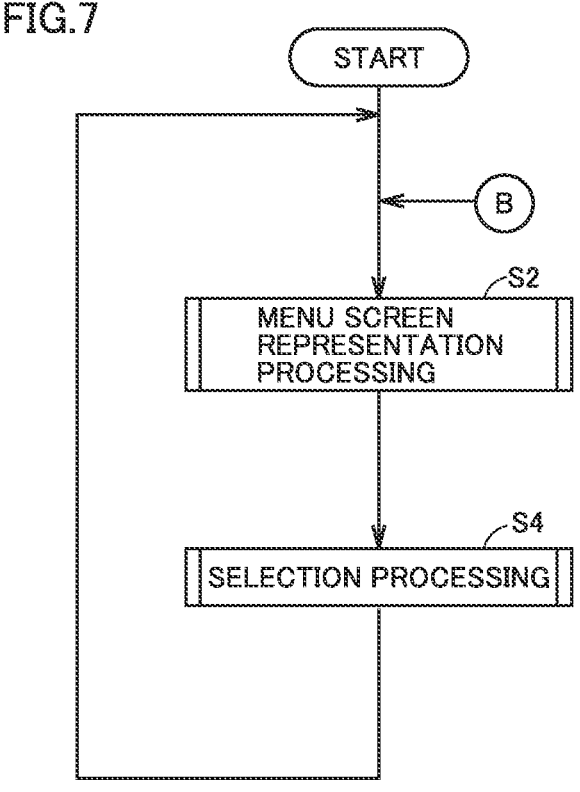
FIG. 7 shows an exemplary illustrative non-limiting flowchart of information processing provided by a menu program 19 based on the embodiment.

FIG. 7 is a flowchart illustrating information processing provided by menu program 19 based on the embodiment.

Referring to FIG. 7, when CPU 12 launches menu program 19, it performs menu screen representation processing (step S2). Details of the menu screen representation processing will be described later.

CPU 12 then performs selection processing (step S4). Details of selection processing will be described later. This processing is repeated.

Figure 8:
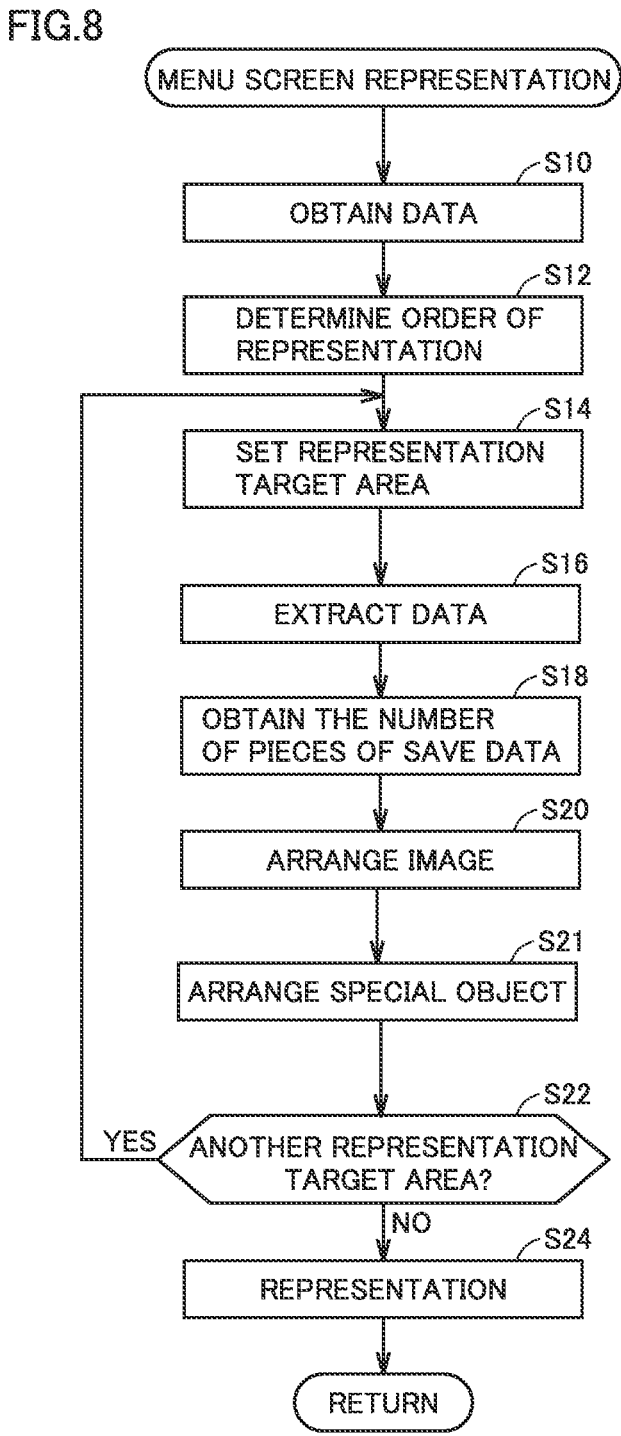
FIG. 8 shows an exemplary illustrative non-limiting flowchart of menu screen representation processing based on the embodiment.

FIG. 8 is a flowchart illustrating menu screen representation processing based on the embodiment.

Referring to FIG. 8, representation controller 202 obtains data (step S10). Specifically, representation controller 202 obtains data on a plurality of game programs 15 stored in first storage 20 and a plurality of pieces of save data 17 stored in second storage 21.

Representation controller 202 then determines the order of representation of game programs and the like to be shown in the menu screen (step S12). By way of example, the order by names of titles is set as initial setting of the order of representation.

Representation controller 202 then sets a representation target area (step S14). Specifically, representation controller 202 sets as the representation target area in menu area 302, a row defined for arranging an image showing a status of progress of game play corresponding to save data and for arranging an image associated with contents of a game program. For example, when two rows 308 are defined in menu area 302, representation controller 202 sets top row 308 as the representation target area.

Representation controller 202 then extracts data (step S16). Representation controller 202 extracts, based on the obtained data, data on game program 15 and save data 17 at the top in the case of representation, for example, in the order by the names of the titles. For example, representation controller 202 extracts data on game program GA and save data SA1 and SA2 by way of example described with reference to FIG. 6.

Representation controller 202 then obtains the number of pieces of save data (step S18). For example, representation controller 202 obtains two pieces of save data SA1 and SA2.

Representation controller 202 then arranges an image showing a status of progress of game play corresponding to the save data and an image associated with contents of the game program (step S20). Representation controller 202 arranges game-program-associated image 310 showing an image of the package of game program GA in the left part of row 308 of interest. Furthermore, representation controller 202 arranges game play images 320 showing screenshot images of save data SA1 and save data SA2 on the right. Representation controller 202 arranges game play images 320 with a size thereof being adjusted, depending on the number of pieces of save data. In the present example, representation controller 202 arranges in an area in row 308, game-program-associated image 310 showing the image of the package of game program GA, game play image 320 showing a screenshot image of save data SA1, and game play image 320 showing a screenshot image of save data SA2, without leaving any space.

Representation controller 202 then arranges a special object (step S21). Representation controller 202 determines whether or not there is save data having the autosave flag ("1") in correspondence with the save data described with reference to FIG. 6, and superimposes characters of the special object ("AUTO") on the image showing the status of progress of corresponding game play for the save data having the autosave flag ("1"). With the special object ("AUTO"), whether or not the save data is save data based on an automatic saving function can readily be known.

Representation controller 202 then determines whether or not there is another representation target area (step S22). For example, when two rows 308 are defined in menu area 302 as described with reference to FIG. 3, representation controller 202 determines that there is a representation target area in a bottom portion.

When representation controller 202 determines in step S22 that there is another representation target area (YES in step S22), the process returns to step S14 where the representation target area is set and processing above is repeated. Representation controller 202 sets bottom row 308 as the representation target area and repeats processing similar to the processing above. Specifically, representation controller 202 arranges game-program-associated image 310 showing the image of the package of game program GB in the left part of row 308 of interest. Furthermore, representation controller 202 arranges game play images 320 showing screenshot images of save data SB1 to SB5 on the right. Representation controller 202 arranges game play images 320 with sizes thereof being adjusted depending on the number of pieces of save data. In the present example, representation controller 202 divides the area of row 308 into two areas to arrange screenshot images of save data SB1 to SB4 in an upper area and arranges a screenshot image of save data SB5 in a lower area. In this case, a space is provided in the lower area. A method of optimized arrangement of save data in row 308 depending on the number of pieces of save data is determined in advance.

When representation controller 202 determines in step S22 that there is no other representation target area (NO in step S22), it has the menu screen shown (step S24). Specifically, as described with reference to FIG. 3, representation controller 202 has the menu screen shown, the menu screen including menu area 302 where game-program-associated images 310 or game play images 320 that graphically express game programs 15 or save data 17 are shown as being aligned.

Then, the process ends (return).

Figure 9:
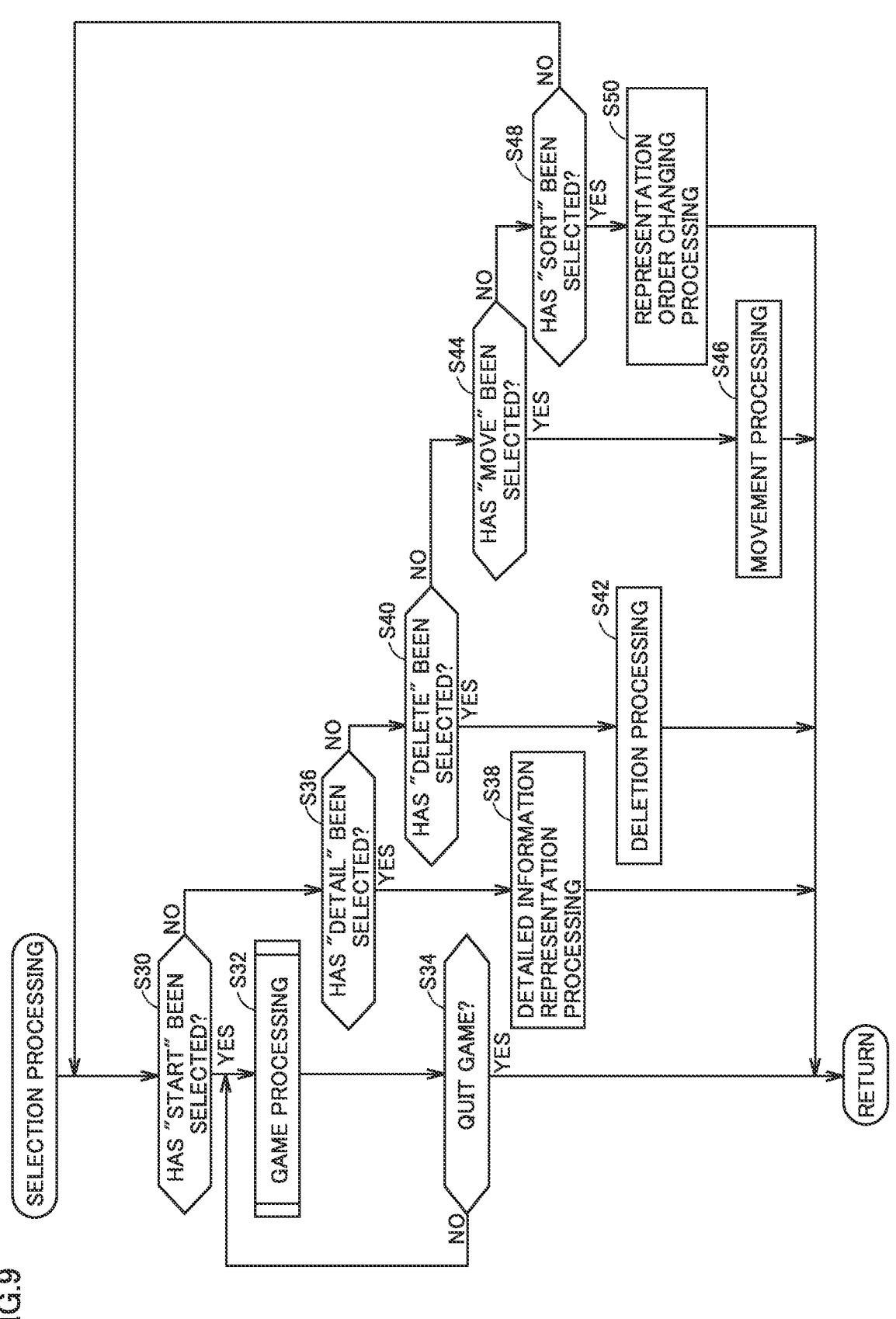
FIG. 9 shows an exemplary illustrative non-limiting flowchart of selection processing by a selector 203 based on the embodiment.

FIG. 9 is a flowchart illustrating selection processing by selector 203 based on the embodiment.

Referring to FIG. 9, selector 203 determines whether or not an operation to select "start" (corresponding to "A") has been performed (step S30).

When an operation to select "start" is performed in step S30 (YES in step S30), selector 203 instructs execution unit 200 to perform game processing and execution unit 200 starts game processing (step S32). Details of game processing will be described later.

Execution unit 200 then determines whether or not to quit the game (step S34).

When execution unit 200 determines in step S34 not to quit the game (NO in step S34), the process returns to step S32 and execution unit 200 continues game processing.

When execution unit 200 determines in step S34 to quit the game (YES in step S34), the process ends (return).

When the operation to select "start" is not performed in step S30 (NO in step S30), selector 203 determines whether or not an operation to select "detail" (corresponding to "X") has been performed (step S36).

When selector 203 determines in step S36 that the operation to select "detail" has been performed (YES in step S36), it instructs detailed information representation processor 204 to perform detailed information representation processing (step S38). Detailed information representation processor 204 has an object or the like showing detailed information shown on menu screen 300 based on meta information or the like of a game program corresponding to selected game play image 320. Then, the process ends (return).

When selector 203 determines in step S36 that the operation to select "detail" has not been performed (NO in step S36), it determines whether or not an operation to select "delete" has been performed (step S40).

When selector 203 determines in step S40 that the operation to select "delete" (corresponding to "-") has been performed (YES in step S40), it instructs deletion unit 206 to perform deletion processing (step S42). Deletion unit 206 performs processing for deleting save data corresponding to selected game play image 320. Then, the process ends (return). In execution of deletion processing, the user may be asked again whether or not the user really desires execution of deletion processing, and deletion processing may be performed after confirmation by the user is obtained.

When selector 203 determines in step S40 that the operation to select "delete" has not been performed (NO in step S40), it determines whether or not an operation to select "move" has been performed (step S44).

When selector 203 determines in step S44 that the operation to select "move" (corresponding to "Y") has been performed (YES in step S44), it instructs movement unit 207 to perform movement processing (step S46). Movement unit 207 changes, by scrolling the screen, a position where the image showing the status of progress of game play corresponding to save data is shown and a position where the image associated with contents of the game program is shown. Then, the process ends (return).

When selector 203 determines in step S44 that the operation to select "move" has not been performed (NO in step S44), it determines whether or not an operation to select "sort" (corresponding to an operation to press and hold "Y") has been performed (step S48).

When selector 203 determines in step S48 that the operation to select "sort" has been performed (YES in step S48), it instructs sorter 205 to perform representation order changing processing for changing the sorting rule (step S50). Then, the process ends (return).

When selector 203 determines in step S48 that the operation to select "sort" has not been performed (NO in step S48), the process returns to step S30.

Figure 10:
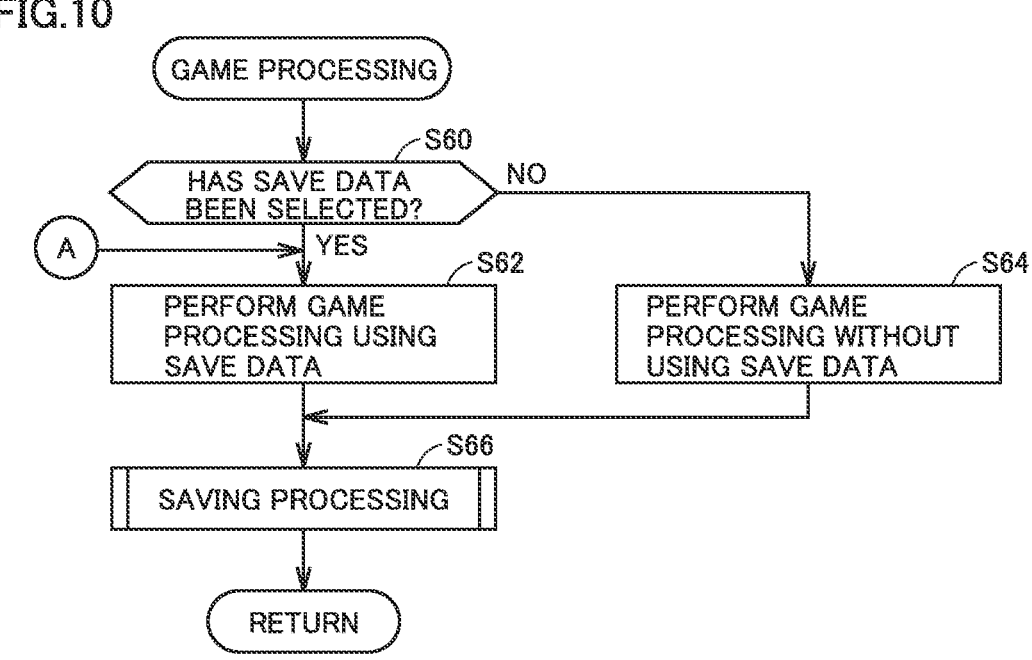
FIG. 10 shows an exemplary illustrative non-limiting flowchart of game processing by an execution unit 200 based on the embodiment.

FIG. 10 is a flowchart illustrating game processing by execution unit 200 based on the embodiment.

Referring to FIG. 10, execution unit 200 determines whether or not save data has been selected (step S60).

Execution unit 200 determines whether or not it has been instructed to execute the corresponding game program based on the save data corresponding to game play image 320 selected by selector 203.

When execution unit 200 determines in step S60 that save data has been selected (YES in step S60), it performs game processing using the save data (step S62). Execution unit 200 executes the corresponding game program based on the save data.

Saving unit 201 then performs saving processing (step S66). Details of saving processing will be described later.

Then, the process ends (return).

When execution unit 200 determines in step S60 that save data has not been selected (NO in step S60), it performs game processing without using save data (step S64). When execution unit 200 is instructed to execute the game program corresponding to game play image 320 selected by selector 203, it executes the corresponding game program.

Saving unit 201 then performs saving processing (step S66). Details of saving processing will be described later.

Then, the process ends (return).

Figure 11:
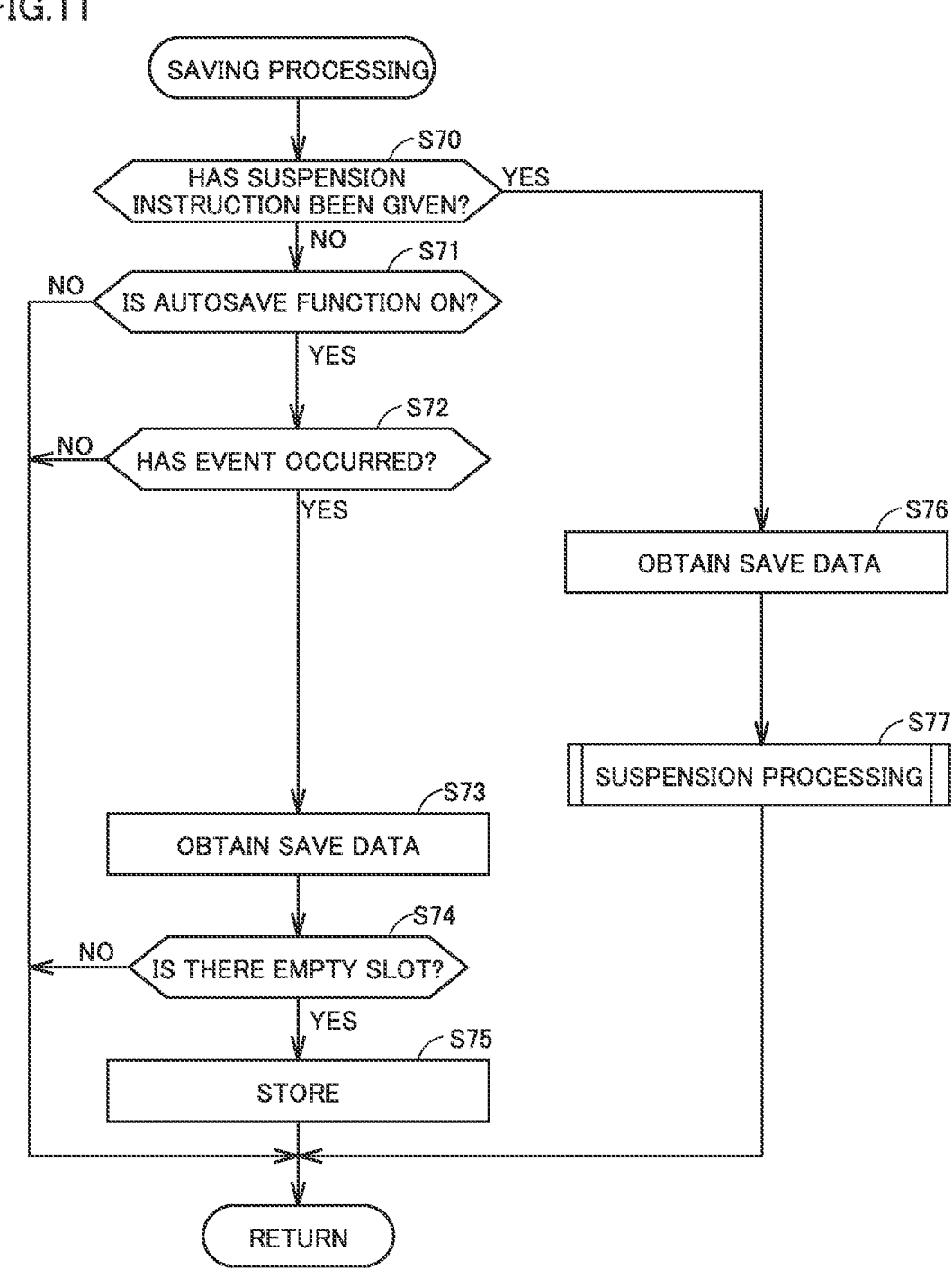
FIG. 11 shows an exemplary illustrative non-limiting flowchart of saving processing by a saving unit 201 based on the embodiment.

FIG. 11 is a flowchart illustrating saving processing by saving unit 201 based on the embodiment.

Referring to FIG. 11, saving unit 201 determines whether or not a suspension instruction has been given (step 70). When saving unit 201 determines in step S70 that the suspension instruction has been given (YES in step S70), it obtains save data (step S76). Saving unit 201 obtains an image showing the status of progress of game play of the game program, together with save data including information necessary for resumption of a game state. Specifically, saving unit 201 obtains a screenshot image resulting from capturing of the game screen at the time of occurrence of an event.

Saving unit 201 then instructs representation controller 202 to perform suspension processing (step S77). Details of suspension processing will be described later.

When saving unit 201 determines in step S70 that the suspension instruction has not been given (NO in step S70), it determines whether or not the autosave function is on (step S71). In the present example, whether or not to use the autosave function for each game program can be set. In a not-shown setting screen, whether or not to turn on the autosave function can be set for each game program.

When saving unit 201 determines that the autosave function is on (YES in step S71), it determines whether or not an event has occurred (step S72).

When saving unit 201 determines in step S72 that no event has occurred (NO in step S72), the process ends (return).

When saving unit 201 determines in step S72 that an event has occurred (YES in step S72), it obtains save data (step S73). Saving unit 201 obtains the image showing the status of progress of game play of the game program together with save data including information necessary for resumption of a game state. Specifically, saving unit 201 obtains a screenshot image resulting from capturing of the game screen at the time of occurrence of the event. The event refers, for example, to clearing of a game stage or change in state of a game. Though an example in which save data is stored as being triggered by occurrence of an event is described in the present example, occurrence of an event does not have to particularly be set as the trigger, and save data may automatically be stored every prescribed time period.

Saving unit 201 then determines whether or not there is an empty slot where data can be stored (step S74).

When saving unit 201 determines that there is an empty slot where data can be stored (YES in step S74), it has data stored therein (step S75).

Specifically, saving unit 201 causes obtained save data, an image, the autosave flag ("1"), and information on time at the time of saving to be stored in a corresponding slot. Then, the process ends (return).

When saving unit 201 determines that there is no empty slot where data can be stored (NO in step S74), step S75 is skipped and the process ends (return) without data being stored.

When saving unit 201 determines that the autosave function is not on (NO in step S71), the process ends (return).

Figure 12:
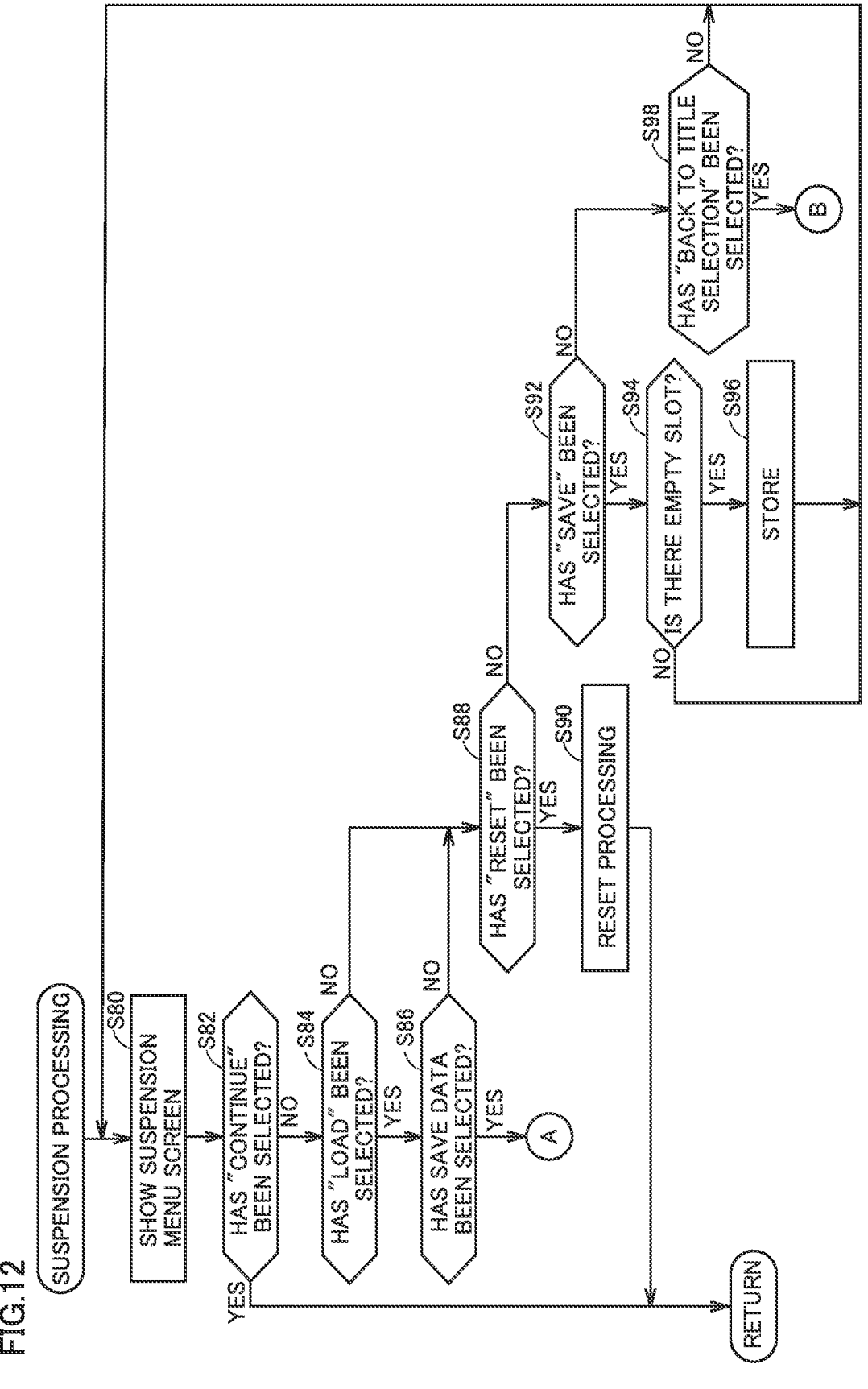
FIG. 12 shows an exemplary illustrative non-limiting flowchart of suspension processing based on the embodiment.

FIG. 12 is a flowchart illustrating suspension processing based on the embodiment.

Referring to FIG. 12, representation controller 202 has the suspension menu screen shown in accordance with a suspension instruction (step S80). Specifically, representation controller 202 has the suspension menu screen described with reference to FIGS. 4 and 5 shown based on save data.

Selector 203 then determines whether or not an operation to select "continue" has been performed (step S82).

When the operation to select "continue" has been performed in step S82 (YES in step S82), the process ends (return). Selector 203 thus instructs execution unit 200 to quit suspension processing and execution unit 200 resumes game processing.

When the operation to select "continue" has not been performed in step S82 (NO in step S82), selector 203 determines whether or not an operation to select "load" has been performed (step S84).

When selector 203 determines in step S84 that the operation to select "load" has been performed (YES in step S84), it determines whether or not save data has been selected (step S86).

When selector 203 determines in step S86 that save data has been selected (YES in step S86), it gives an instruction to execution unit 200 and the process proceeds to A. Specifically, the process proceeds to step S62 in FIG. 10. Execution unit 200 performs game processing using save data selected by selector 203.

When the operation to select "load" has not been performed in step S84 (NO in step S84) or when the operation to select save data has not been performed in step S86 (NO in step S86), whether or not an operation to select "reset" has been performed is determined (step S88).

When selector 203 determines in step S88 that the operation to select "reset" has been performed (YES in step S88), it instructs deletion unit 206 to perform reset processing (step S90). Deletion unit 206 performs reset processing to reset the status of progress of the game program. Then, the process ends (return). Deletion unit 206 thus instructs execution unit 200 to quit suspension processing and execution unit 200 resumes game processing with the status of progress of the game program before suspension having been reset.

When selector 203 determines in step S88 that the operation to select "reset" has not been performed (NO in step S88), it determines whether or not an operation to select "save" has been performed (step S92).

When selector 203 determines in step S92 that the operation to select "save" has been performed (YES in step S92), it instructs saving unit 201 to determine whether or not there is an empty slot where data can be stored (step S94).

When saving unit 201 determines that there is an empty slot where data can be stored (YES in step S94), it has data stored therein (step S96). Specifically, saving unit 201 causes save data obtained in step S76 in FIG. 11, an image, and information on time at the time of saving to be stored in a corresponding slot. Then, the process ends and returns to step S80.

When saving unit 201 determines that there is no empty slot where data can be stored (NO in step S94), step S96 is skipped and the process ends without data being stored and returns to step S80. Saving unit 201 does not have the autosave flag ("1") stored because present saving does not fall under saving using the autosave function.

When selector 203 determines in step S92 that the operation to select "save" has not been performed (NO in step S92), it determines whether or not an operation to select "back to title selection" has been performed (step S98).

When selector 203 determines in step S98 that the operation to select "back to title selection" has been performed (YES in step S98), the process proceeds to B. Specifically, the process proceeds to step S2 in FIG. 7. Selector 203 instructs representation controller 202 to have the menu screen described with reference to FIG. 3 shown.

When selector 203 determines in step S98 that the operation to select "back to title selection" has not been performed (NO in step S98), the process returns to step S80.

Through the processing above, save data can be stored by overwriting, read, and deleted in various manners in the suspension menu screen and user's convenience can be improved.

[F. Additional Aspect]

Though an example where data is not stored when there is no empty slot where save data is stored is described in the embodiment, in addition thereto, the user may be notified that data could not be stored. The notification can encourage the user to edit save data and clean up necessary slots so that user's convenience can be improved.

Though an example in which a screenshot image (still image) resulting from capturing of a game screen is shown as game play image 320 is described in the embodiment, moving images may be shown as game play image 320 without being particularly limited to the still image. For example, key operation information (key log data) over a prescribed period may be stored, moving images that reproduce an actual status of play by the user may be generated based on the key log data, and generated moving images may be shown as game play images 320. A name of a location in a game space where save data is stored, information on time at the time of saving, and the like may be shown instead of game play image 320, as being added to (superimposed on) game play image 320, or as being in proximity to game play image 320.

Though an example in which save data saved owing to the autosave function is shown with a special object ("AUTO") being superimposed thereon is described in the embodiment, another sign may be used without being limited to characters. A plurality of special objects may be provided, without being limited to a single type of special object. Recently stored data or data stored within a certain period may be shown, for example, with characters such as "NEW" being superimposed thereon.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A game system comprising:

at least one computer;

a first storage configured to store a plurality of game programs; and a second storage configured to store save data of the plurality of game programs and to store a plurality of pieces of save data for at least one game program, wherein the computer:

executes at least one game program among the plurality of game programs stored in the first storage, causes the second storage to store save data of the game program that is being executed, based on a status of execution of the game program, causes a display to show a list of information corresponding to save data for each piece of save data of the game program for which a plurality of pieces of save data are stored among pieces of save data of the plurality of game programs stored in the second storage, and selects information corresponding to one piece of save data from the shown list of information corresponding to the pieces of save data shown on the display, based on an operation input from a user, to execute a game program includes to execute a corresponding game program based on save data in response to selection of information corresponding to the save data; and to cause the second storage to store save data further includes to cause the second storage to store, together with the save data, an image showing a status of progress of game play corresponding to that save data, and to cause a display to show a list of information includes to cause the display to show, as the information corresponding to the save data, images arranged adjacent to each other, each respective image showing a status of progress of game play corresponding to that save data.

2. The game system according to claim 1, wherein the list of information is arranged by each corresponding game program.

3. The game system according to claim 2, wherein information indicating the game program is displayed together with the information corresponding to the save data arranged for each game program.

4. The game system according to claim 3, wherein the information indicating the game program includes an image associated with contents of the game program.

5. The game system according to claim 3, wherein in response to selection of the information indicating the game program, the game program corresponding is executed without using save data stored in the second storage.

6. The game system according to claim 3, wherein the information indicating the game program includes an image of a screen showing a title of the game program.

7. The game system according to claim 1, wherein to cause the second storage to store save data includes to cause the second storage to store save data of the game program that is being executed automatically or based on an operation input from the user, and the information corresponding to the save data includes information indicating that save data has automatically been stored in the second storage.

8. The game system according to claim 1, wherein to cause the second storage to store save data includes to disallow storage in the second storage of new save data of the game program that is being executed when a number of all pieces of save data for the plurality of game programs stored in the second storage has reached a predetermined upper limit number.

9. The game system according to claim 1, wherein to cause the second storage to store save data includes to disallow storage in the second storage of new save data of the game program that is being executed when a data capacity for all pieces of save data for the plurality of game programs stored in the second storage has reached a predetermined upper limit capacity.

10. The game system according to claim 1, wherein to cause a display to show a list of information includes to allocate, for each game program, a prescribed area where the display is caused to show a list of information corresponding to save data and to cause a list of information corresponding to the save data for each piece of save data of the corresponding game program to be shown in each area.

11. A non-transitory storage medium encoded with a computer readable information processing program executed by a computer of a game system including a first storage configured to store a plurality of game programs and a second storage configured to store save data of the plurality of game programs and to store a plurality of pieces of save data for at least one game program, at least one computer being configured to perform operations comprising:

executing at least one game program among the plurality of game programs stored in the first storage;

causing the second storage to store save data of the game program that is being executed, based on a status of execution of the game program, where an image showing a status of progress of game play corresponding to that save data is stored together with the save data;

causing a display to show a list of information corresponding to save data for each piece of save data of the game program for which a plurality of pieces of save data are stored among pieces of save data of the plurality of game programs stored in the second storage, where a respective image stored corresponding to respective save data are displayed as the information corresponding to the save data, where the respective images are arranged adjacent to each other;

selecting information corresponding to one piece of save data from the shown list of information corresponding to the pieces of save data shown on the display based on an operation input from a user; and executing the corresponding game program based on the save data in response to selection of the information corresponding to the save data.

12. The non-transitory storage medium encoded with a computer readable information processing program according to claim 11, wherein the list of information is arranged by each corresponding game program.

13. The non-transitory storage medium encoded with a computer readable information processing program according to claim 12, wherein information indicating the game program is displayed together with the information corresponding to the save data arranged for each game program.

14. The non-transitory storage medium encoded with a computer readable information processing program according to claim 13, wherein the information indicating the game program includes an image associated with contents of the game program.

15. The non-transitory storage medium encoded with a computer readable information processing program according to claim 14, wherein in response to selection of the information indicating the game program, the game program corresponding is executed without using save data stored in the second storage.

16. The non-transitory storage medium encoded with a computer readable information processing program according to claim 13, wherein the information indicating the game program includes an image of a screen showing a title of the game program.

17. The non-transitory storage medium encoded with a computer readable information processing program according to claim 11, wherein the causing the second storage to store save data includes causing the second storage to store save data of the game program that is being executed automatically or based on an operation input from the user, and the information corresponding to the save data includes information indicating that save data has automatically been stored in the second storage.

18. The non-transitory storage medium encoded with a computer readable information processing program according to claim 11, wherein the causing the second storage to store save data includes disallowing storage in the second storage of new save data of the game program that is being executed when a data capacity for all pieces of save data for the plurality of game programs stored in the second storage has reached a predetermined upper limit capacity.

19. The non-transitory storage medium encoded with a computer readable information processing program according to claim 11, wherein the causing the display to show a list of information includes allocating for each game program a prescribed area where the display is caused to show a list of information corresponding to save data and causing a list of information corresponding to the save data for each piece of save data of the corresponding game program to be shown in each area.

20. An information processing method comprising:

executing at least one game program among a plurality of game programs stored in a first storage;

causing a second storage to store save data of a game program that is being executed, based on a status of execution, where an image showing a status of progress of game play corresponding to that save data is stored together with the save data;

causing a display to show a list of information corresponding to the save data for each piece of save data of a game program for which a plurality of pieces of save data are stored among pieces of save data of the plurality of game programs stored in the second storage, where a respective image stored corresponding to respective save data are displayed as the information corresponding to the save data, where the respective images are arranged adjacent to each other; and selecting information corresponding to one piece of save data from the shown list of information corresponding to the save data shown on the display, based on an operation input from a user, wherein the executing a game program includes executing a corresponding game program based on the save data in response to selection of the information corresponding to the save data.

21. The information processing method according to claim 20, wherein the list of information is arranged by each corresponding game program and information indicating the game program is displayed together with the information corresponding to the save data, and wherein in response to selection of the information indicating the game program, the game program which corresponds is executed without using the save data stored in the second storage.

22. The information processing method according to claim 20, wherein the causing the second storage to store save data includes disallowing storage in the second storage of new save data of the game program that is being executed when a data capacity for all pieces of save data for the plurality of game programs stored in the second storage has reached a predetermined upper limit capacity.

* * * * *